Patented June 4, 1946

2,401,599

UNITED STATES PATENT OFFICE 2,401,599

PREPARATION OF ACYL BIURETS

Pierrepont Adams, Glenbrook, Conn., assignor to American Cyanamid Company, New York, N. Y., a corporation of Maine No Drawing. Application June 8, 1943, Serial No. 490,075

5 Claims. (Cl. 260—553)

This invention relates to a new and improved method of preparing acyl biurets.

Acyl biurets, as a class, are known compounds and methods have previously been described for their preparation. The known methods of preparing acyl biurets, however, are subject to numerous procedural difficulties and are limited in scope. Some methods of preparing acyl biurets are suitable only for the production of more or less specific types of these compounds. Since the acyl biurets are highly useful compounds particularly as local anesthetics and in the production of dyes, resins, and other organic chemicals, and as their properties vary with the acyl substituent, it is desirable that an easy method of preparing all types and kinds of acyl biurets be made available.

I have discovered that all known kinds of acyl biurets, and also others not heretofore described, can be prepared easily in very good yields by my new method to be described and claimed herein. Briefly, my new method involves the hydrolysis of an acyl guanylurea with an acid or acidic substance in the presence of water. The reaction equation of my new process may be illustrated as follows using an acyl guanylurea, water and hydrochloric acid as the reactants as follows:

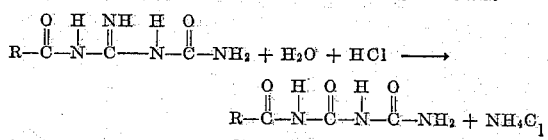

R represents any aliphatic, aromatic, alicyclic or heterocyclic radical.

I have also discovered that acyl biurets may be prepared by treatment of an acyl dicyandiamide with an acid or acidic substance. In this latter reaction, I believe that the acyl dicyandiamide is first converted into an acyl guanylurea as follows:

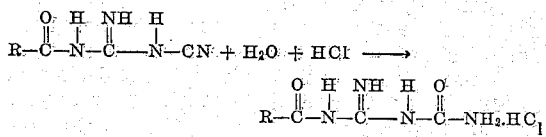

This latter compound is then further hydrolyzed to the acyl biuret as previously shown. From the above it will be seen that my new process involves the steps of hydrolyzing an acyl dicyandiamide or acyl guanylurea with an acidic material in the presence of water until an acyl biuret has been formed.

The amount, concentration and kind of acidic material employed by me to convert acyl dicyandiamides and acyl guanylureas to acyl biurets is subject to variation. The acidic material may be organic or inorganic but should have a dissociation constant of at least $1 \times 10^{-4}$. Among the suitable acids which may be employed to prepare acyl biurets from acyl dicyandiamides and acyl guanylureas may be mentioned, hydrochloric, sulfuric, sulfamic, phosphoric, nitric, phthalic, fumaric, maleic, chloroacetic, toluenesulfonic, dichloroacetic, dibromoacetic, nitrobenzoic, orthotoluic and other acids of like characteristics. Certain acidic salts may also be used to convert acyl guanylureas and acyl dicyandiamides to acyl biurets. Cyanamide hydrochloride may be illustrated as such an acidic salt and its use is shown in Example 2.

The acid salts of the acyl guanylureas to be converted to acyl biurets may also be used without additional acidic material. The use of such salts is shown in Examples 8 and 9.

As will also be apparent from the specific examples, the concentration of the acidic material may vary considerably. The amount of acid may also vary but, as shown by the first equation above, at least one molecular portion of a monovalent acid is required to complete the reaction. In the case of di-valent and tri-valent acids, less acid may be used. As a general rule, however, I prefer to use a slight excess of free acid ordinarily from about 1.1 to 2.5 moles of acid for each equivalent of acyl dicyandiamide or acyl guanylurea.

The temperature at which my reaction is carried out may vary from about 50° C. up to 100° C. or higher. The reaction requires less time for completion at higher temperatures and I prefer to carry it out at the refluxing temperature of the reaction mass. Since water is the usual solvent employed, its refluxing temperature will be of the order of 100° C. However, in the case of some difficultly soluble acyl dicyandiamides or acyl guanylureas it may be desirable to use moderate amounts of other solvents such as alcohol, dioxane, Cellosolve, pyridine or the like. In these special cases the refluxing temperature of the reaction mixture may vary somewhat from 100° C.

The length of time required to complete the reaction may also vary somewhat with the concentration and strength of the particular acid employed, the nature of the acyl dicyandiamide or acyl guanylurea used, the quantity of the reactants, and the temperature. In most cases the reaction is completed within one hour at refluxing temperatures. However, no harm is done if the heating is continued for 3 or 4 hours at refluxing temperatures. If lower temperatures are used, of the order of 40–50° C., heating for 4 to 5 hours would not be an unusual requirement. Accordingly, the best procedure is to heat the reaction mixture until the desired acyl biuret has been formed as shown by experience.

When starting with acyl dicyandiamide as the principal reactant, it is necessary to first convert this material to acyl guanylurea. Ordinarily, this reaction is complete within 15 or 20 minutes, and the formation of acyl biuret will then start to take place shortly thereafter. Reference to the specific examples will show much latitude in the heating time.

Any aliphatic, aromatic, alicyclic, or heterocyclic acyl guanylurea may be converted into a corresponding aliphatic, aromatic, alicyclic or heterocyclic acyl biuret in accordance with my process as described. Representing the acyl biurets by the general formula

in which B is a biuret radical, R can be any aliphatic, aromatic, alicyclic or heterocyclic radical. The radical R may be saturated or unsaturated, straight chain or branched chain, primary, secondary or tertiary. The aliphatic, aromatic, alicyclic or heterocyclic radical may be further substituted with one or more substituents of various types and kinds. Specific acyl dicyandiamides and acyl guanylureas in which R is an aliphatic radical which are suitable for use in my process and which can be converted into corresponding acyl biurets are: acetyl guanylurea, butyrylguanylurea, decanoylguanylurea, dodecanoylguanylurea, tetradecanoylguanylurea, octadecanoylguanylurea, butyryldicyandiamide, caproyldicyandiamide, lauroyldicyandiamide, stearoyldicyandiamide, palmitoyldicyandiamide, etc. Aliphatic guanylureas in which R in the general formula, above, is a branched aliphatic chain that are suitable for conversion to acyl biurets are: diethylacetylguanylurea, n-butylethylacetylguanylurea, isoamylethylacetylguanylurea, ethyldimethylacetylguanylurea and the corresponding acyl dicyandiamides. Specific among the unsaturated aliphatic acyl guanylureas which may be converted to corresponding acyl biurets may be mentioned; undecylenoylguanylurea, ethylallylacetylguanylurea, diallylacetylguanylurea, etc.

Various aliphatic acyl guanylureas and dicyandiamides which are substituted with various types and kinds of substituents can be converted to the corresponding acyl biurets by means of my process. Among such substituted aliphatic acyl guanylureas and dicyandiamides are; bromocaproylguanylurea, bromocaproyldicyandiamide, 9,10-dichlorostearoylguanylurea, 9,10 - dichlorostearoyldicyandiamide, nitrovaleroylguanylurea, β-N-acetylbutylaminoprorylguanylurea, ω-hydroxydecanoylguanylurea, ω-carboxyvaleroyldicyandiamide, etc.

Various acyl guanylureas and acyl dicyandiamides which are substituted with aromatic groups may also be used in my reaction. Among these are benzoylguanylurea and various substituted benzoyl guanylureas such as p-aminobenzoylguanylurea, m - methoxybenzoylguanylurea, o - nitrobenzoylguanylureas, o - carboxybenzoylguanylurea, p-hydroxybenzoylguanylureas, benzoyldicyandiamide, p-aminobenzoyldicyandiamide, o-nitrobenzoyldicyandiamide, p-hydroxybenzoyldicyandiamide, and the like. Various acyl biurets may be prepared in which R is a heterocyclic radical from acyl guanylureas or acyl dicyandiamides such as; nicotinoylguanylurea, nicotinoyldicyandiamide, and others. Acyl guanylureas and acyl dicyandiamides such as; naphthenoylguanylurea, naphthenoyldicyandiamide, etc. may be used to yield alicyclic substituted acyl biurets.

Complex acyl biurets containing two

groups may also be prepared by my method by using such acyl guanylureas and acyl dicyandiamides as glutarylguanylurea, adipoylguanylurea, sebacylguanylurea, succinylguanylurea, phthalylguanylurea, hexahydrophthalylguanylurea, etc. The corresponding acyl dicyandiamides may also be used. Miscellaneous acyl guanylureas and acyl dicyandiamides which may be converted to acyl biurets includes phenoxyacetylguanylurea, furylacrylylguanylurea, m-hydroxyphenoxyacetyldicyandiamide, α-naphthoylguanylurea, β-5-sulfonaphthoylguanylurea, cycylohexylacetylguanylurea, cyclohexylacetyldicyandiamide, hexahydrobenzoylguanylurea, cyclopentaylacetylguanylurea, and many others.

The acyl dicyandiamides named above may be prepared by treating dicyandiamide with an appropriate acyl halide or acyl anhydride, water and an alkali metal hydroxide and allowing the mixture to react at temperatures not in excess of about 60° C. until an acyl dicyandiamide is formed. Preparation of a representative acyl dicyandiamide, benzoyl dicyandiamide, is illustrated in Example 4. The acyl guanylureas are prepared by hydrolyzing the terminal —CN group of an acylated dicyandiamide with an acid having a dissociation constant of at least $1 \times 10^{-4}$. Preparation of a typical acyl guanylurea is illustrated in Example 8.

The acyl biurets are, in general, soluble in polar solvents such as alcohols, Cellosolve, pyridine, etc. They are, for the most part, insoluble in solvents such as acetone, dioxane, benzene, toluene, etc. They are soluble in solutions of alkalis, fairly soluble in water and are generally insoluble in acids. They are broadly characterized by having high melting points.

My invention will now be described in greater detail by means of the following specific examples in which the preparation of representative acyl biurets from acyl dicyandiamides and acyl guanylureas is described. It should be understood that the invention is not to be limited to these particular examples or to the particular conditions given therein, since, as stated before, the process may be modified in many of its aspects both as to reactants and reaction conditions.

*Example 1*

12.6 parts by weight of acetyldicyandiamide, 15.0 parts by weight of 87% phosphoric acid and 100 parts by weight of water were mixed and heated at refluxing temperatures for one hour during all of which time the reaction mixture was clear. The solution was cooled and allowed to stand in a refrigerator over night whereupon a crystalline precipitate was formed. After recrystallizing the material from water and drying, it had a melting point of 193–194° C.

Elementary analysis obtained for the product agreed with the calculated values for acetylbiuret, and is as follows:

| Acetylbiuret | Per cent C | Per cent H | Per cent N |
|---|---|---|---|
| Calculated | 32.46 | 5.15 | 29.00 |
| Found | 32.43 | 4.84 | 28.97 |

*Example 2*

12.6 parts by weight of acetyldicyandiamide, 7.8 parts by weight of cyanamide hydrochloride and 100 parts by weight of water were mixed and heated at refluxing temperatures for 1.25 hours. The reaction mixture was then allowed to cool and the crystalline precipitate separated by filtration. The recrystallized product was found to be acetylbiuret having approximately the same melting point and chemical analysis as the product obtained by the procedure of Example 1.

*Example 3*

10 parts by weight of lauroyldicyandiamide, 20 parts by weight of 10% hydrochloric acid and 50 parts by weight of water were heated to refluxing temperatures. A clear solution was obtained at first but after about 10 minutes heating a precipitate had begun to form. To the badly foaming reaction mixture was added approximately 40 parts by weight of 95% ethyl alcohol in order to increase the solubility of the lauroylbiuret and/or lauroylguanylurea hydrochloride which had formed in the reaction mixture. Refluxing was continued for a total of 2 hours. The solid precipitate was then recrystallized from 80% ethanol and when dried was found to have a melting point of 155–157° C.

Elementary analysis obtained for the recrystallized material agreed with the calculated values for lauroylbiuret and is as follows:

| Lauroylbiuret | Per cent C | Per cent H | Per cent N |
|---|---|---|---|
| Calculated | 59.00 | 9.19 | 14.84 |
| Found | 59.14 | 9.21 | 14.99 |

*Example 4*

63.5 g. of 95% sodium hydroxide dissolved in 125 cc. of water were placed in a three-necked flask provided with a stirrer, dropping funnel, and thermometer. 63 g. of pulverized dicyandiamide was added to the sodium hydroxide solution with stirring until dissolved. 150 cc. of acetone was then added. The resulting double layer was agitated thoroughly and the temperature kept between 20–25° C. while 70.25 g. of benzoyl chloride was added in the course of ½ hour. During this time a solid separated but addition of water after the reaction was complete gave a clear, very light yellow solution. Acidification of the solution with acetic acid precipitated a colorless solid which was filtered, washed well with water and allowed to air dry. The product, benzoyl dicyandiamide,

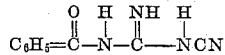

was recovered with a yield of 71.5%.

18.8 parts by weight of benzoyldicyandiamide, 55 parts by weight of 10% hydrochloric acid and 100 parts by weight of water were heated at refluxing temperatures for 2 hours after which the reaction mixture was cooled and precipitated benzoylbiuret recovered by filtration. The recrystallized product had a melting point of 220° C. and elementary analysis gave the following results:

| Benzoylbiuret | Per cent C | Per cent H | Per cent N |
|---|---|---|---|
| Calculated | 52.09 | 4.33 | 20.54 |
| Found | 52.14 | 4.57 | 20.32 |

*Example 5*

18.8 parts by weight of benzoyldicyandiamide, 15 parts by weight of 95.5% sulfuric acid and 100 parts by weight of water were heated at refluxing temperatures for one hour after which the precipitated material was recovered and recrystallized. The purified product had a melting point of 220° C. and the material was identical to the product obtained in the above example.

*Example 6*

The above example was repeated using 13.5 parts by weight of 70% nitric acid in place of the sulfuric acid. Benzoylbiuret was obtained in a 77.4% yield. The product had substantially the same melting point and chemical analysis as the product of Example 4.

*Example 7*

Benzoylbiuret was also prepared as above by heating 18.8 parts by weight of benzoyldicyandiamide with 9.7 parts by weight of sulfamic acid in 100 parts by weight of water at refluxing temperatures for 2 hours. The product had a melting point of 220° C. as in the other preparations.

*Example 8*

37.6 parts by weight of benzoyldicyandiamide was heated to refluxing temperatures with 100 parts by weight of 10% hydrochloric acid. After refluxing 5 minutes the clear solution was filtered and cooled. The precipitate which formed upon cooling was recrystallized from hot water and dried in a vacuum desiccator. The product, benzoylguanylurea hydrochloride, melted with decomposition at 166° C.

To 24.25 parts by weight of the above guanylurea hydrochloride was added 100 parts by weight of water and the reaction mixture was heated under a reflux condenser for one hour. Two minutes after refluxing started a precipitate formed which later proved to be benzoylbiuret. The yield was 65.2% of the theoretical. The product had a melting point of 220° C. and analyzed correctly for benzoylbiuret.

*Example 9*

24.25 parts by weight of benzoylguanylurea hydrochloride in 100 parts of water was heated at a temperature between 50–60° C. for 3 hours. Upon cooling the reaction mixture and separating the resulting crystalline precipitate, benzoylbiuret was obtained.

*Example 10*

7.8 parts by weight of m-nitrobenzoyldicyandiamide was added to 5 parts by weight of concentrated HCl in 35 parts by weight of water. The mixture was heated at refluxing temperature for one hour. When refluxing started the reaction mixture was clear but an oil soon separated. On cooling the reaction mixture the oil-like material solidified. It was separated by filtration, redissolved in hot water, recrystallized and then dried. After recrystallization, the product, m-nitrobenzoylbiuret, had a melting point of 187–190° C.

I claim:

1. A method of preparing acyl biurets which comprises the steps of heating for at least one hour at temperatures of at least 50° C. a member of the group consisting of acyl dicyandiamides and acyl guanylureas with an acid having a dissociation constant of at least $1 \times 10^{-4}$ in the presence of water until an acyl biuret has been formed, stopping the heating before any substantial decomposition of the biuret has occurred and recovering the thus formed biuret.

2. A method of preparing aliphatic acyl biurets which comprises the steps of heating for at least one hour at temperatures in excess of about 50° C. a member of the group consisting of aliphatic acyl guanylureas and aliphatic acyl dicyandiamides with at least an equimolecular proportion of an acid having a dissociation constant of at least $1\times10^{-4}$ and in the presence of water until an aliphatic acyl biuret has been formed, stopping the heating before any substantial decomposition of the biuret has occurred and recovering the thus formed biuret.

3. A method of preparing aromatic acyl biurets which comprises the steps of heating for at least one hour at temperatures in excess of about 50° C. a member of the group consisting of aromatic acyl guanylureas and aromatic acyl dicyandiamides with at least an equimolecular proportion of an acid having a dissociation constant of at least $1\times10^{-4}$ in the presence of water until an aromatic acyl biuret has been formed, stopping the heating before any substantial decomposition of the biuret has occurred and recovering the thus formed biuret.

4. A method of preparing benzyl biuret which comprises heating for at least one hour benzoylguanylurea with water and 1.1 to 2.5 moles of an acid having a dissociation constant of at least $1\times10^{-4}$ until benzoyl biuret has been formed, stopping the heating before any substantial decomposition of the biuret has occurred and recovering the thus formed biuret.

5. A method of preparing lauroyl biuret which comprises heating for at least one hour lauroylguanylurea with water and 1.1 to 2.5 moles of an acid having a dissociation constant of at least $1\times10^{-4}$ until lauroyl biuret has been formed, stopping the heating before any substantial decomposition of the biuret has occurred and recovering the thus formed biuret.

PIERREPONT ADAMS.